Figure 1:
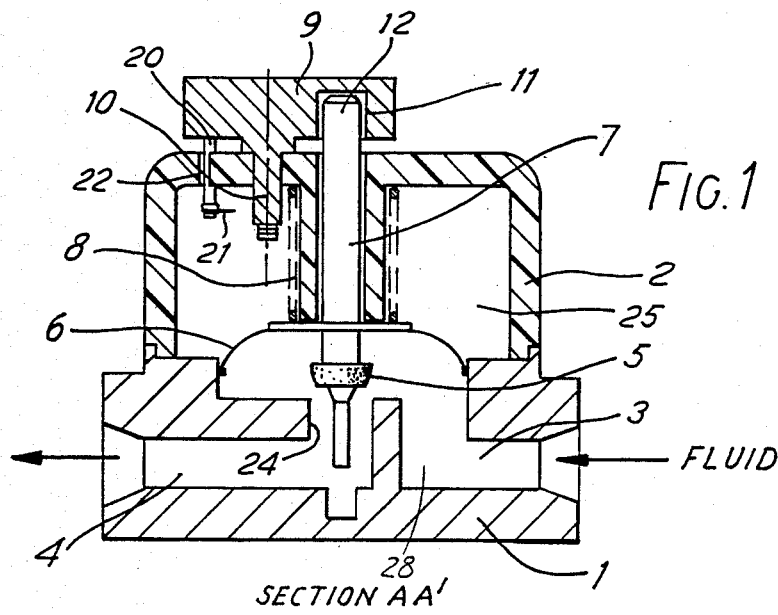

United States Patent [19]

Imiolex et al.

[11] Patent Number: 4,847,599
[45] Date of Patent: Jul. 11, 1989

[54] FLUID LEAK DETECTOR

[75] Inventors: Mieczyslaw Imiolex, Withington; Arthur Alexander, Rickmansworth, both of England

[73] Assignee: THORN EMI Flow Measurement Limited, Manchester, England

[21] Appl. No.: 144,120

[22] Filed: Jan. 15, 1988

[30] Foreign Application Priority Data

Jan. 16, 1987 [GB] United Kingdom ............... 8701032

[51] Int. Cl.$^4$ .............................................. G01M 3/08
[52] U.S. Cl. ................................. 340/605; 73/40.5 R
[58] Field of Search ..................... 340/605; 73/40.5 R

[56] References Cited

U.S. PATENT DOCUMENTS

| 1,940,346 | 12/1933 | Edwards | 340/605 X |
| 2,230,961 | 2/1941 | Lewis | 340/605 |
| 2,683,261 | 7/1954 | Safford | 340/605 X |
| 3,454,195 | 7/1969 | Deters | 73/40.5 R |
| 4,573,343 | 3/1986 | Huiber | 73/40.5 R |
| 4,679,587 | 7/1987 | Jarr | 73/40.5 R X |

FOREIGN PATENT DOCUMENTS

| 0150143 | 7/1985 | European Pat. Off. |
| 1195103 | 6/1965 | Fed. Rep. of Germany ... 73/40.5 R |
| 3333234 | 3/1985 | Fed. Rep. of Germany . |
| 3340358 | 4/1985 | Fed. Rep. of Germany . |
| 7307140 | 9/1974 | France . |
| 8318497 | 5/1985 | France . |
| 2564560 | 11/1985 | France . |
| 1485461 | 9/1977 | United Kingdom . |
| 1496436 | 12/1977 | United Kingdom . |

Primary Examiner—Stewart J. Levy
Assistant Examiner—Joseph W. Roskos
Attorney, Agent, or Firm—Fleit, Jacobson, Cohn, Price, Holman & Stern

[57] ABSTRACT

A fluid leak detector has a body with a chamber provided with a fluid inlet and outlet. A valve is disposed between the inlet and outlet and the valve closure member is connected to a diaphragm. Fluid in the chamber applies pressure on the diaphragm and the detector includes means which allow the valve to be open at a pressure greater than a predetermined value and cause the valve to close at pressures below that value, which may be due to a fluid leak. The detector has a safety lock-off mechanism which locks the valve once it has closed and which must be reset to allow the valve to open when fluid pressure has been restored. The detector also provides a visual indication of fluid leaks. A fluid supply installation incorporating the fluid leak detector will shut down the fluid supply if a leak is detected.

10 Claims, 3 Drawing Sheets

SECTION AA'

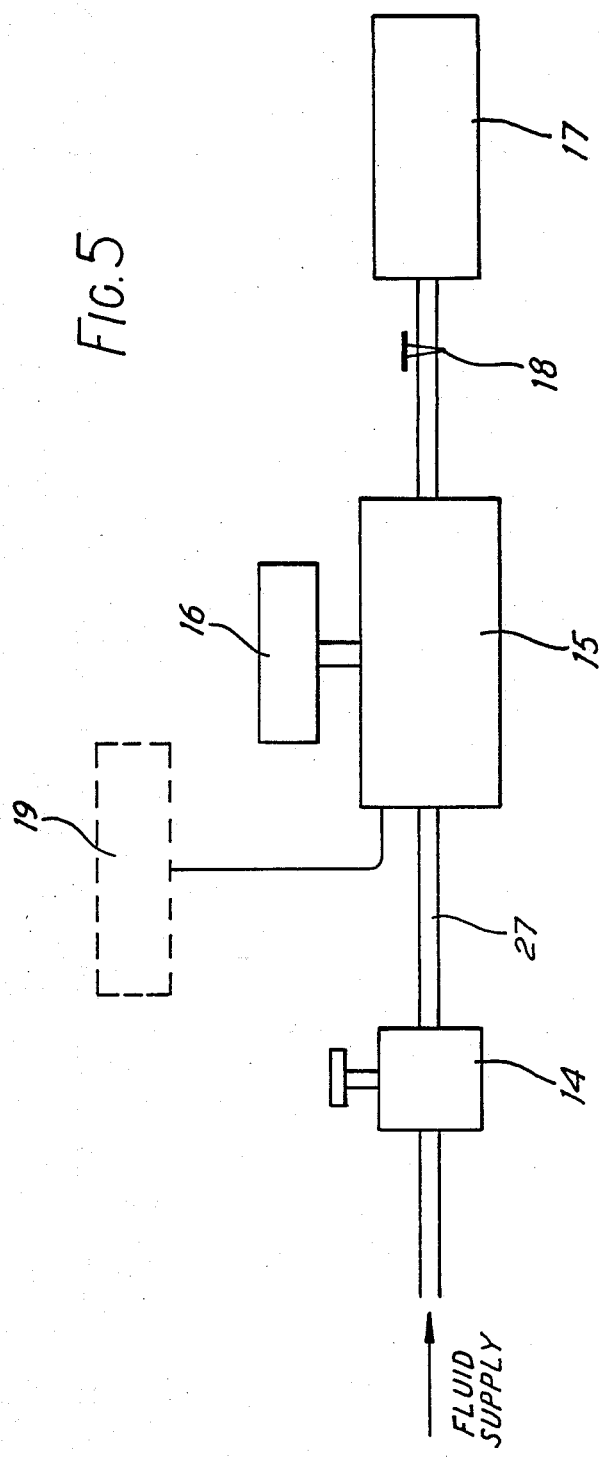

FLUID LEAK DETECTOR

This invention relates to a method for detecting leaks in a fluid supply and to a leak detector with a safety lock-off and a visual indicator. In particular it relates to the detection of gas leaks in a domestic or an industrial supply.

Several devices are known which comprise a valve and a manometric diaphragm, one side of which is subject to the pressure of the fluid and in which the valve closes in response to a drop in fluid pressure.

French Pat. No. 7307140 discloses such a device. This pneumatic resetting device has a fluid bypass to allow fluid action to be re-established on the diaphragm when the valve is closed. The re-opening of the valve is subject to external control.

European Pat. No. 0,150,143 describes a diaphragm device with no permanent lock-off mechanism.

German Pat. No. 3340358 describes a device which compares fluid pressure on one side of the diaphragm with atmospheric pressure on the other. A valve is opened and closed by means of magnets. The device is for determining gas flow, and has no permanent lock-off mechanism.

German Pat. No. 33 33 234 has a bypass path and a two stage piston.

French Pat. No. 83 18497 describes, rather than a straightforward valve, a complex device having a shutter which comprises an element which "flutters" and pivots in a sleeve and controls the position of a membrane.

UK Pat. No. 1,485,461 describes a device for turning off a fuel supply on detection of combustible gases. Leaks are detected by monitoring the gas concentration in the surroundings.

It is an object of the invention to provide an improved fluid leak detector.

According to one aspect of the invention there is provided a fluid leak detector comprising a body member (1) having a chamber (28) provided with a fluid inlet (3) and a fluid outlet (4), between which is disposed a valve having a valve closure member (5), the closure member being connected to a diaphragm (6), the arrangement being such that when fluid is present in the chamber is applies pressure on the diaphragm, the detector further including means (8) for controlling closure of the valve such that the valve is allowed to be open when pressure on the diaphragm due to fluid is maintained at a value greater than or equal to a predetermined value and that the valve is caused to close when said pressure is below said predetermined value, the detector further including safety lock-off means (7, 9, 20, 21, 22, 23) for locking the valve into position when closed, and means (7, 9, 11, 12) for allowing the lock-off means to be released to allow the valve to open in response to a fluid pressure greater than or equal to said predetermined value, and means providing a visual indication that a fluid pressure below said predetermined value has occurred since preceding release of the lock-off means.

The visual indication may be provided by means of a handle which is in one position when the valve is closed and in a different position when it is open.

The device is simple to use, and may be constructed of low cost compared with other devices. Differences from prior art devices include the feature that action of the fluid on the diaphragm is possible when the valve is closed since the diaphragm is on the fluid inlet side of the valve and a valve bypass path is not therefore necessary.

According to another aspect of the invention there is provided a fluid supply installation incorporating a fluid leak detector according to the invention.

Figure 2:
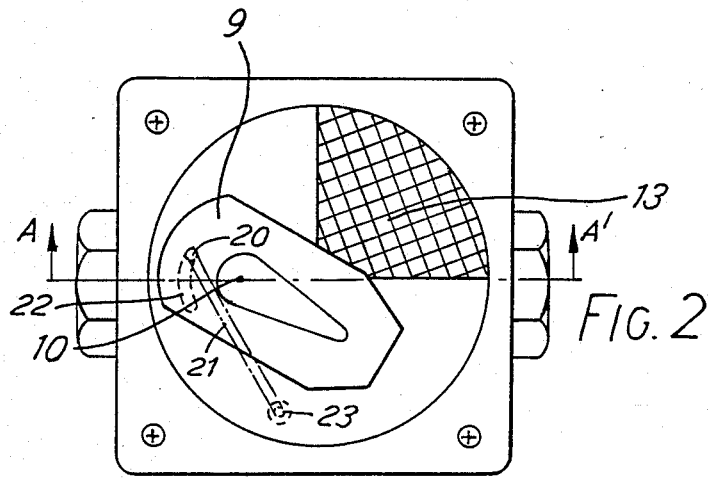
Figure 3:
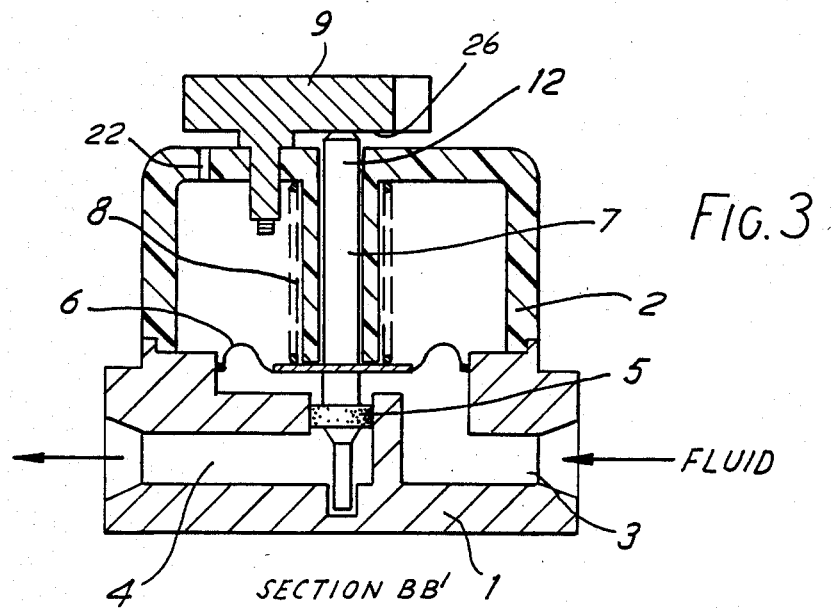
Figure 4:
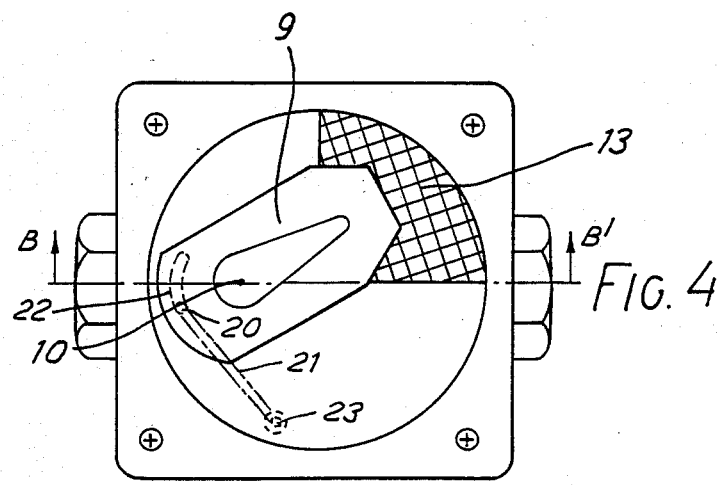

In order that the invention may be clearly understood and readily carried into effect, it will be described by way of example, with reference to the accompanying drawings, of which:

FIG. 1 is a part cross-sectional side elevation along line AA' of a fluid leak detector allowing normal fluid flow (in the "ON" position), FIG. 2 is a plan view of the detector as shown in FIG. 1, FIG. 3 is a part cross-sectional side elevation along line BB' of a fluid leak detector with the valve closed ("OFF"), FIG. 4 is a plan view of the detector as shown in FIG. 3, and FIG. 5 schematically represents a system incorporating a leak detector according to the invention.

Referring first to FIG. 1, this shows a fluid leak detector having a body 1, which may be of metal, a cover 2 which is plastic in the embodiment illustrated, a chamber 28 provided with an inlet 3 and an outlet 4, a a valve closure member 5, a diaphragm 6, a control shaft 7, a control spring 8 and a handle 9 pivotable about axis 10 and having a recess 11 for receiving an end 12 of the control shaft.

Also shown in FIG. 1 are a spring peg 20 attached to the handle, a slot 20 in the cover 2 and a spring 21 which is shown only in part to prevent other detail from being obscured.

In normal conditions, when fluid begins to flow through inlet 3 of the detector from a supply, the pressure due to the fluid pushes on diaphragm 6, moving diaphragm 6 upwards. (All references to "upwards" etc., which depend on the orientation of the device, are, for convenience, related to the illustrated orientation, but it will be obvious that the detector will also work in other orientations). When diaphragm 6 moves upwards, the control shaft 7, to which the diaphragm is attached, also moves upwards and moves valve closure member 5 upwards away from valve seat 24 which opens the valve and allows the passage of fluid from the inlet to the outlet of the device. When the control shaft is in the raised position (i.e. valve open) its upper end 12 is received in a recess 11 in the handle 9.

The diaphragm is subject to opposing forces due, on one side, to the fluid and, on the other side, to means for returning the valve to the closed position, in this case the control spring 8, and to other forces including gravitational forces and (if the cover is not sealed to the atmosphere) due to pressure of air above the diaphragm in the cavity 25 in the cover. These other forces will be neglected in the following description. The device is designed such that a drop in fluid pressure below a predetermined value causes the valve to close automatically. The predetermined value is determined by the forces acting on the diaphragm as described hereinbefore and may usefully be set by adjustment to the control spring. The predetermined value may correspond to the intended working fluid pressure of fluid in a system in which the detector is intended to be disposed, in which case the detector can shut down the system when it is operating.

FIG. 2 shows a top plan view of the device in the "ON" position (i.e. valve open) which corresponds to FIG. 1.

The position of the handle 9 indicates whether the valve is open or closed. The axis about which the handle is pivotable is indicated by 10. Quadrant 13 marked on the cover is coloured to provide an ON/OFF indicator in conjunction with the handle. Also shown in FIG. 2 (dotted since they are obscured by illustrated features in the plan view) are the positions of slot 22 in the cover, spring peg 20 which is at one end of the slot 22 when the handel is in the position shown, spring 21 and a further peg 23 fixed to the cover. Spring 21 extends between the pegs 20 and 23 and when the device is in the ON position as illustrated, the spring is under tension.

If the pressure due to the fluid below the diaphragm falls below the predetermined value, which may be caused, for example, by a fluid leak, the forces acting downwards on the diaphragm exceed those acting upwards and the diaphragm moves downwards, bringing the control shaft 7 downwards and the valve seal 5 into the valve seat 24 to close the valve. The upper end 12 of the control shaft moves downwards out of the recess 11 in the handle 9.

In the absence of any other mechanism, restoration of the fluid pressure acting on the diaphragm to a value greater than or equal to the predetermined value would cause the diaphragm and control shaft to move upwards again and hence the valve to open.

However, once the valve of a leak detector according to the invention has been caused to close in response to low pressure, it cannot be reopened merely in response to restoration of a pressure greater than or equal to the predetermined value; the detector must first be reset. This is referred to as a "safety lock-off", since it will prevent the restoration of the fluid supply if there is a leak in the system, which is particularly undesirable if combustible gases are involved. FIG. 3 shows the valve in the closed position. It is biased to this position by the action of spring 21. When the upper end 12 of the control shaft 7 is withdrawn from recess 11 in the handle 9, spring 21 pulls peg 20 to the other end of slot 22 (opposite to the end it is at in FIG. 2), as shown in FIG. 4 and this rotates the handle about axis 10 to the "OFF" position, shown in both FIGS. 3 and 4, indicating that a leak or drop in fluid pressure below the diaphragm has occurred. The control shaft is no longer directly below the recess in the handle and a lower face 26 of the handle keeps the control shaft in the "down" or "OFF" position, face 26 abutting the top of the control shaft if it attempts to move upwards. In order to restore the open condition the handle must be reset, and this is conveniently done manually, rotating the handle to the position shown in FIG. 2, to line up the control shaft and handle recess and allow the shaft to move upwards into the recess in response to fluid pressure greater than or equal to the predetermined value. Since the detector remains in the "OFF" position until it has been reset, when the handle is in the position shown in FIGS. 3 and 4, this indicates that a leak or drop in fluid pressure has occurred since the lock-off means was last released.

The valve may also include a switch for activating a visible or audible alarm when the valve closes, indicating a leak or drop in fluid pressure.

An alarm may be controlled, for example, by the well-known combination of a magnet and a reed switch, to detect the position of the control shaft and hence whether the valve is open or closed. In the illustrated embodiment, the magnet could be connected to the control shaft and a reed switch may be in a fixed position, e.g. attached to the cover, the reed switch switching an external alarm or indicator circuit of any suitable known form.

FIG. 5 shows a fluid supply installation with a leak detector 15 according to the invention incorporated in the supply line 17 between the main cock 14 and an appliance 17. Tap 18 can be used to turn off the supply to the appliance. The leak detector has a handle 16 which acts an an ON/OFF indicator and the detector may also be optionally connected to an audio or visual alarm 19. The fluid supplied may be gas.

If the predetermined value of pressure below which the valve closes corresponds to the normal pressure in the system when the system is closed, in order to detect a leak or drop in pressure due, for example to the supply (e.g. an LPG bottle) being exhausted, the main cock and appliances should be turned off. In this case leakage of fluid anywhere in the system between the main cock and appliances is detected.

The device should be installed as close as possible to the supply (e.g. gas cylinders), but in the environment to be protected.

The following steps should be taken when installing the device:

1. Switch on the supply at the main supply valve.
2. Switch the leak detector to the ON position (valve open).
3. Switch on and ignite the appliance.

The opening up and closing down sequences are also important for the correct operation of the leak detector.

The opening up sequence should be as follows:

1. Switch on the fluid supply and turn the detector handle to the ON (open) position. (At this stage the pressure of the fluid acting upon the diaphragm pushes up the control shaft 7 into the recess in the handle as illustrated in FIG. 1, which holds the handle in the open (ON) position).
2. Turn on the appliance.

The closing down sequence should be as follows:

1. Switch the appliance off.
2. Switch the fluid supply off. (For convenience, a cock could be provided at the inlet to the leak detecting device.)

If at this stage the fluid in the installation remains at a pressure greater than or equal to the predetermined value (in this case the predetermined value corresponding to the normal pressure when the system is closed) there is no leak. If the pressure falls, indicating a leak, the valve will shut off and the reset handle indicator will turn to the OFF position.

The detector should always be checked before the supply is turned on. If it is in the OFF position, either there has been a leak or the supply (e.g. LPG bottle) has run out. The following safety precautions are then advisable:

1. Ventilate the area and avoid sparks.
2. Check that appliances and bottle (or other supply) are turned off.
3. Turn on supply.
4. Turn on detector.
5. Turn on the appliance slightly but do not ignite it.
6. Turn the system off in order of appliance then supply.

If the detector then turns to the OFF position within 15 minutes, this may indicate a significant leak in the system which should be found and rectified. If it takes longer than 15 minutes to turn off this indicates a leak in the system which is too small to cause concern. (The 15 minute time period is only an example and may be altered as appropriate for any particular system.) The system can be reset when the leak has been dealt with.

Any alarm associated with the device to indicate a leak or drop in pressure should preferably be mounted outside the environment to be protected.

In order to test the detector or any visible or audible alarm associated with it, the appliance may be turned on whilst leaving the main cock turned off. This means that the fluid pressure will drop below the predetermined value and the value will close if it is operating correctly.

The automatic lock-off of the device ensures that once a leak is detected fluid cannot flow to the environment system even if the main cock is turned on again. If the handle is turned to the ON position to enable the shaft to be lifted and the valve returned to the open position before the leak has been attended to, the device will again turn itself off when the above conditions are applied and the handle will return to the OFF position. When the correct conditions are introduced and maintained, turning of the handle will restore the supply.

The device is particularly useful for gas supplies, for example low pressure gas systems supplied by bottles or cylinders and may be used as a leak indicator for markets such as caravans, boats and small domestic installations. In addition to detecting leaks in the system the valve will shut off, for example, if an LPG bottle (used as a supply) is empty or is changed when the main cock is on, or if appliances are left on with the main cock turned off. (The work "leak" is intended to cover drops in fluid pressure due to such other causes.) It can easily be used by the layman as it has a simple reset mechanism and offers a simple visual indication of a leak.

The device is also useful for prepayment gas meter installations. When a prepayment gas meter is installed in conjunction with, for example, a gas fire, if the meter shuts off when the fire is turned on, a fluid leak detector in the supply line will operate to cut off the supply. This will prevent prepaying of the meter whilst the fire is still on but not lit.

We claim:

1. A fluid leak detector comprising:
    a body member having a chamber provided with a fluid inlet and a fluid outlet, between which is disposed a valve having a valve closure member, the closure member being connected to a diaphragm, the arrangement being such that when fluid is present in the chamber it applies pressure on the diaphragm;
    the detector further including means for controlling closure of the valve such that the valve is allowed to be open when the pressure differential across the diaphragm between the fluid pressure at said inlet and the ambient pressure external to the body exceeds a predetermined value and that the valve is caused to close when said pressure differential is below said predetermined value;
    the detector further including safety lock-off means for locking the valve into position when closed, and means for allowing the lock-off means to be released to allow the valve to open in response to a pressure differential across the diaphragm greater than or equal to said predetermined value and means providing a said indication that a pressure differential below said predetermined value has occurred since preceding release of the lock-off means.

2. A detector according to claim 1, the safety lock-off means being provided by a control shaft attached to the valve closure member in conjunction with a member, the member cooperating with biasing means which move the member into a position when the valve closure member is in the closed position such that a surface of member abuts an end of the control shaft and prevents the valve from opening.

3. A fluid supply installation incorporating a fluid leak detector according to claim 1.

4. A detector according to claim 1 in which the means for controlling closure is arranged such that the predetermined pressure differential is less than or equal to the intended working fluid pressure of a system in which the detector is intended to be disposed.

5. A detector according to claim 1 including an audio or visual alarm at a location remote from the detector to provide at said remote location an indication of a fluid pressure differential below said predetermined value.

6. A fluid leak detector comprising:
    a body member having a chamber provided with a fluid inlet and a fluid outlet between is disposed a valve having a valve closure member, the closure member being connected to a diaphragm the arrangement being such that when fluid is present in the chamber it applies pressure on the diaphragm;
    the detector further including means for controlling closure of the valve such that the valve is allowed to be open when the pressure differential across the diaphragm between the fluid pressure at said inlet and the ambient pressure external to the body exceeds a predetermined value and that the value is caused to close when said pressure differential is below said predetermined value;
    the detector further including safety lock-off means for leaking the valve into position when closed, and means for allowing the lock-off means to be released to allow the valve to open in response to a pressure differential across the diaphragm greater than or equal to said predetermined value, and means providing a visual indication that a pressure differential below said predetermined value has occurred since preceding release of the lock-off means;
    the safety lock-off means being provided by a control shaft attached to the valve closure member in conjunction with a member, the member cooperating with biasing means which move the member into a position when the valve closure member is in the closed position such that a surface of the member abuts an end of the control shaft and prevents the valve from opening;
    the means for allowing the lock-off means to be released comprising a recess in the member for receiving an end of the control shaft, the member being manually rotatable to a position such that the recess is substantially aligned with the end.

7. A fluid leak detector comprising:
    a body member having a chamber provided with a fluid inlet and a fluid outlet between is disposed a valve having a valve closure member, the closure member being connected to a diaphragm the arrangement being such that when fluid is present in the chamber it applies pressure on the diaphragm;
    the detector further including means for controlling closure of the valve such that the valve is allowed to be open when the pressure differential across the diaphragm between the fluid pressure at said inlet and the ambient pressure external to the body exceeds a predetermined value and that the valve is caused to close when said pressure differential is below said predetermined value;

the detector further including safety lock-off means for locking the valve into position when closed, and means for allowing the lock-off means to be released to allow the valve to open in response to a pressure differential across the diaphragm greater than or equal to said predetermined value and means providing a visual indication that a pressure difference below said predetermined value has occurred since preceding release of the lock-off means;

the safety lock-off means being provided by a control shaft attached to the valve closure member in conjunction with a handle, which is adapted to provide said visual indication of a pressure differential below said predetermined value, the handle cooperating with biasing means which move the handle into a position when the valve closure member is in the closed position such that a surface of the handle abuts an end of the control shaft and prevents the valve from opening.

8. A fluid flow path closure device comprising:

a body member having a chamber provided with a fluid inlet and a fluid outlet;

a closure member disposed between said inlet and outlet and adapted when closed to prevent fluid flow between said inlet and said outlet and when open to allow said fluid flow;

means responsive to a pressure differential between fluid pressure at said fluid inlet and ambient pressure external to said body member to urge said closure member to be open when said pressure differential exceeds a predetermined value;

latch means adapted to lock said closure member in position when closed, means for releasing said latch means to allow said closure member to open in response to said pressure differential in excess of said predetermined value; and means providing a visual indication that closure member is locked in said closed position.

9. A fluid flow path closure device comprising:

a body member having a chamber provided with a fluid inlet adapted to be connected to a supply of fluid under pressure and a fluid outlet adapted to be connected to fluid receiving equipment;

a closure member located in said chamber and adapted when open to provide a fluid path between said inlet and said outlet and when closed to seal said inlet from said outlet;

pressure differential sensitive means responsive to a pressure differential between said inlet and ambient pressure external to said chamber to urge said closure member to be open;

means adapted to urge said closure member to a closed position and adapted to cooperate with the pressure differential sensitive means in use so that the closure member is open when said pressure differential exceeds a predetermined value and is closed when said pressure differential falls below said predetermined value if the pressure at said inlet or said outlet falls when said supply is closed;

latch means adapted to lock said closure member in position when closed;

means for releasing said latch means to allow said closure to open in response to said pressure differential in excess of said predetermined value; and means providing a visual indication that said closure member is locked in said closed position.

10. A method of detecting a leak in a fluid flow system between a supply of fluid under pressure and fluid receiving equipment, the method including the steps of;

(1) locating in the system a fluid flow path closure device adapted to
   (a) close to shut off the flow in said system and releasably lock closed when the differential pressure, between fluid in the system and pressure external to the system, falls below a predetermined value
   (b) to open if released when said differential pressure in above said predetermined value and
   (c) visibly to indicate being closed;

(2) releasing said closure device to open with said system under pressure;

(3) isolating the system from said supply and preventing consumption of fluid by said fluid receiving equipment;

(4) waiting for a predetermined period and (5) observing whether said closure valve has closed during said period to indicate a leak above a predetermined level.

* * * * *